United States Patent Office 2,854,466
Patented Sept. 30, 1958

2,854,466

TRICHLOROMETHYL-PARA-ACETYLAMINO-BENZENE-THIOLSULPHONATE

Henderikus Obias Huisman, Weesp, and Martinus Johannes Koopmans, The Hague, Netherlands, assignors, by mesne assignments, to North American Philips Company, Inc., New York, N. Y., a corporation of Delaware No Drawing. Application April 27, 1954
Serial No. 426,034

Claims priority, application Netherlands April 29, 1953

3 Claims. (Cl. 260—453)

This invention relates to fungicides and methods of making the same, and more particularly to a fungicide having a trichloro-methyl-thiolsulphonate group.

Known fungicides having a trichloro-methyl-thiolsulphonate group such as trichloro-methylbenzene, thiolsulphonate and trichloro-methyl-paratoluene-thiolsulphonate exhibit a fungicide effect. The structural formulas for said compounds are

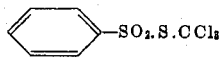

(I)

and

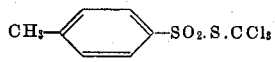

(II)

respectively.

From the research which led to this invention it has been found that said compounds I and II have the disadvantage that they exhibit a strong phytotoxicity, which becomes particularly manifest in damage to leaves and germ cells.

A chief object of this invention is to provide a fungicide having an $SO_2.S.CCl_3$ group which does not affect the leaves and stems of the vegetation to be protected from fungi.

It has now been found to our surprise and in accordance with the invention that by introducing an acetylamino-group into the benzene nucleus in the para-position with respect to the trichloro-methyl-thiolsulphonate group, $SO_2.S.CCl_3$, a compound is obtained in which a vigorous fungicide effect is attended with an extremely slight phytotoxicity. Said compound, the trichloromethyl-para-acetylaminobenzene-thiolsulphonate, has the structural formula

(III)

In order to produce compound III, perchloromethylmercaptan is reacted with an alkaline metal salt of para-acetylaminobenzene-sulfinic acid, for example, the sodium, lithium and potassium metal salts, sodium being preferred. The latter compound may be obtained from para-acetylamino-benzene-sulphochloride, which is converted into a strong alkaline agent with sodium sulphite. The para-acetlyamino-benzene-sulfochloride may be obtained by a reaction of chloro-sulfonic acid with acetanilide. In the following example the production of compound III is described in detail.

Example 81 g. (0.6 mol.) of acetanilide was added in approximately 30 minutes at a temperature of 15° C. to 20° C., while stirring, to 198 ccms. (348 g., 2.99 mol.) of chlorosulfonic acid. Thereafter the solution was heated at 60° C. for approximately 30 additional minutes. Then the reaction mixture was poured out carefully into ice-water and the precipitated para-acetylaminobenzene-sulfochloride was filtered out and then washed out with a small quantity of water. Since the impure reaction product can be conserved only for a short time, it was immediately reduced, after one night of drying in a vacuum exsiccator over concentrated sulphuric acid, into the sodium salt of para-acetylaminobenzene-sulfinic acid. The weight of the raw, slightly moist para-acetylaminobenzene-sulfochloride was 203 g.

The raw para-acetylaminobenzene-sulfochloride obtained in the aforesaid manner was added to a solution of 302.4 g. (1.2 mol.) of sodium sulphite in 600 ccms. of water. While stirring the mixture, 40 ccms. of caustic soda (50% by weight of NaOH) was added dropwise thereto. A strong development of heat was produced, during the dissolution and conversion of the para-acetylaminobenzene-sulfochloride into the sodium salt of para-acetylaminobenzene-sulfinic acid. After two more hours of stirring the solution was filtered and the filtrate was acidified with a solution of 152 g. of concentrated sulphuric acid in 100 ccms. of water. The precipitated para-acetylaminobenzene-sulfinic acid was filtered out, washed out with a small quantity of water and converted with an equivalent quantity of caustic soda into the sodium salt. After evaporation and drying at 100° C. 80 g. of the dry sodium salt of para-acetylaminobenzene-sulfinic acid was obtained. This means a yield of 60.3% with respect to the quantity of acetanilide, used as the starting material.

The sodium salt of para-acetylaminobenzene-sulfinic acid was then converted with perchloromethyl mercaptan into trichloro-methyl-para-acetylaminobenzene-thiolsulphonate according to the reaction

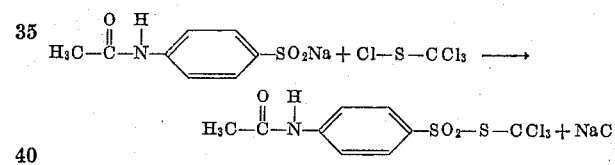

in the following manner:

A solution of 13.1 g. (0.07 mol.) of perchloromethylmercaptan in 60 ccms. of absolute benzene was added dropwise, while stirring, to a mixture of 12 g. (0.0543 mol.) of the sodium salt of para-acetylaminobenzene-sulfinic acid and 145 ccms. of absolute benzene. The mixture was then boiled in an oil bath of 110° C. using a reflux cooler for seven hours, after which the liquid was filtered hot. Upon slight cooling the trichloromethyl-para-acetylamino-thiolsulphonate was crystallized from the filtrate. After one night at room temperature, the compound was suction filtered yielding 12.5 g. of said compound. The filter residue mainly consisting of sodium chloride was boiled with benzene for a few hours, after which it was filtered out. After cooling the filtrate an additional 0.7 g. of compound III was obtained. The total yield thus was 13.2 g. or 69.8% with respect to the sodium salt of para-acetylaminobenzene-sulfinic acid. The melting point was 144° C. to 148° C. (while dissociating). Subsequent to recrystallization from benzene the melting point was 150° C. to 155° C. (while dissociating). The result of the elementary analysis was the following:

| | C | H | N | Cl | S |
|---|---|---|---|---|---|
| Calculated for $C_9H_8O_3NCl_3S_2$ | 31.00 | 2.31 | 4.02 | 30.51 | 18.39 |
| Found | 31.32 | 2.54 | 4.25 | 30.25 | 18.30 |

The fungitoxicity of the compound III was determined by a spore germinating experiment, in which a diluted cherry essence (1 part by weight of dry substance in 1000 parts by weight of water) was used as a stimulus for the germinating process. The experiment was made with the spores of ten fungi. The results of the determinations made twice are resumed in the following table:

| Weight parts trichloromethyl-para-acetylaminobenzene thiolsulphonate by million by weight parts of water | Botrytis allii | Aleurisma carnis | Sclerotinia fructigena | Fusarium culmorum | Penicillium italicum | Pythium debaryanum | Cladosporium herbarum | Rhizopus nigricans | Glomerella cingulata | Alternaria Tenuis | Total |
|---|---|---|---|---|---|---|---|---|---|---|---|
| 0.08 | 2 3 | 3 3 | 3 3 | 3 3 | 3 3 | 3 3 | 3 3 | 3 3 | 3 3 | 3 3 | 59 |
| 0.16 | 2 3 | 2 2 | 2 3 | 3 3 | 3 3 | 3 3 | 2 3 | 2 3 | 3 3 | 3 3 | 54 |
| 0.32 | 2 2 | 2 2 | 1 1 | 2 1 | 2 3 | 2 2 | 2 3 | 2 3 | 3 2 | 3 3 | 42 |
| 0.64 | 0 2 | 0 1 | 0 0 | 0 0 | 1 1 | 2 2 | 1 1 | 2 3 | 1 0 | 2 3 | 22 |
| 1.3 | 0 0 | 0 0 | 0 0 | 0 0 | 0 0 | 2 2 | 0 0 | 2 2 | 0 0 | 1 1 | 10 |
| 2.5 | 0 0 | 0 0 | 0 0 | 0 0 | 0 0 | 2 2 | 0 0 | 0 2 | 0 0 | 0 0 | 6 |
| 5.0 | 0 0 | 0 0 | 0 0 | 0 0 | 0 0 | 2 2 | 0 0 | 0 0 | 0 0 | 0 0 | 4 |

Explanation of the figures:
0 = no germination.
1 = only a few spores exhibit a commencement of germination or, spores are swollen;
2 = germination retained with respect to control spore;
3 = germination equal to the control spore.

Apart from *Pythium debaryanum*, a fungus known to be killed only with great difficulty, extremely low concentrations of compound III exhibit strong fungitoxicity.

For determining the phytotoxicity a solution of 12.5% by weight of the compound III in acetone was sprayed over a number of higher plants in a quantity of 10 cc. per 1000 cm.² of surface. After the plants had been kept for five days at a daylight illumination of about 3000 lux, in a relative moisture of about 85% and at a temperature of 23° C. to 24° C., the measure of corrosion of the leaves was observed. Apple, potato, endive, pea, broad bean, white bean, tomato, cucumber, capsicum, Indian cress, chrysanthemum, cyclamen, chamber lime tree, geranium, colaeus, fuchsia had not suffered from the treatment, in which about 1.25 mg. of the compound III per cm.² of leaf had been applied. Begonia exhibited slight corrosion at the leaf edges.

For warm-blooded animals the compound III must be considered to be only slightly harmful. During experiments with mice the toxic deadly limit dose was found to be a quantity of about 700 mg. of the compound computed on the basis of a weight of one kilogram of mouse.

The compound III may be worked up to fungicide preparations in various ways. Possible agents are:

(a) Mixable oils having 15 to 20% by weight of active constituent, 15% by weight of non-ionogeneous emulgator and otherwise solvents (principally ketones, for example, cyclohexanone);

(b) Aerosoles having solvents for example acetone, methylethylketone and cyclohexanone and a "propellant" for example methylchloride of the commercial Freon;

(c) Spray powders having 50 to 80% of active substance and otherwise flow-out agents, for example, fatty alcohol sulphonates and dispersion means and/or carriers, for example, coaline, clay, pipe clay and additions to avoid clots, for example, colloidal silicic acid;

(d) Lycopodium powders having, for example, 5% of active substance in a mixture of infusorial silica and dolomite marl;

(e) Seed protecting agents, for example 50% of the active substance combined with caoline with the addition of adhesives, for example, spindle-tree oil;

(f) So-called "coated dust," in which the active substance is applied to an absorbing carrier, for example, infusorial silica.

While we have described our invention in connection with specific embodiments and applications, other modifications thereof will be readily apparent to those skilled in this art without departing from the spirit and scope of the invention as defined in the appended claims.

What is claimed is:

1. The compound trichloromethyl-para-acetylaminobenzene thiolsulphonate having the structural formula,

2. A mixture of trichloromethyl-para-acetylaminobenzene-thiolsulphonate and an inert solid carrier.

3. A mixture of trichloromethyl-para-acetylaminobenzene-thiolsulphonate and an inert liquid carrier.

References Cited in the file of this patent

UNITED STATES PATENTS

| 2,340,757 | Kaase et al. | Feb. 1, 1944 |
| 2,537,691 | Mowry et al. | Jan. 9, 1951 |

OTHER REFERENCES

Backer et al.: Rec. Trav. Chim. 71, 1082–5 (1952), as abstracted in 47 C. A., 9898 (1953).